Oct. 16, 1945.  H. F. EISENGREIN  2,386,782
EXTRUDING AND APPARATUS THEREFOR
Filed Feb. 10, 1943
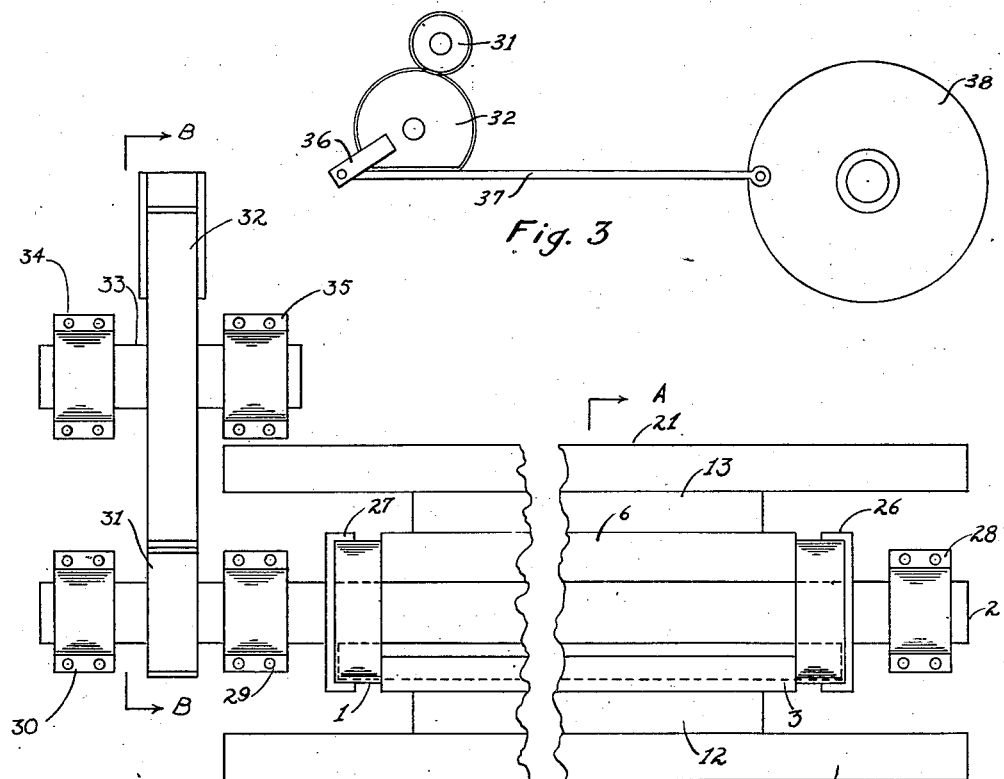
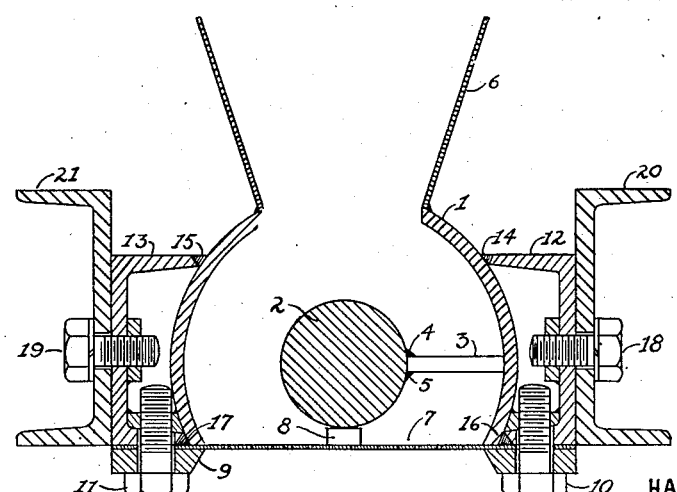
INVENTOR.
HARRY F. EISENGREIN
BY
Charles E. Carney
ATTORNEY Patented Oct. 16, 1945

2,386,782

UNITED STATES PATENT OFFICE 2,386,782

EXTRUDING AND APPARATUS THEREFOR

Harry F. Eisengrein, Rochester, N. Y., assignor to The Glidden Company, Cleveland, Ohio, a corporation of Ohio Application February 10, 1943, Serial No. 475,459

3 Claims. (Cl. 146—174)

The present invention is directed to a method and apparatus for extruding plastic material into strings or strips. It is particularly concerned with the conversion of potatoes or other food materials into a form preparatory to dehydration.

This preparation of starchy materials is an extremely delicate treatment which must be made in such a manner that the number of ruptured starch cells be kept at a minimum. Furthermore the strips or shreds must be distributed over the dehydrating surface with a minimum of handling in order to eliminate mashing of the product.

A primary object of this invention is to provide a new method of simple low pressure extrusion of potatoes and other starchy materials without substantial damages to cell structure.

Another important object is to provide a simple device to accomplish the foregoing object.

A further object is to provide a single extruding device which may be used in conjunction with the wide dehydrating trays and endless dehydrating belts.

Another object is to provide said device with an automatic pressure release when predetermined low pressures are exceeded.

Other objects will be apparent to those skilled in the art from the following description of the invention.

Figure 1 is a plan view of the extruding device.

Figure 2 is a cross-section on line A—A of Figure 1.

Figure 3 is a section at line B—B of Figure 1.

In the production of dehydrated materials such as potatoes there are a number of important factors involved. The first of these to be discussed will be extreme cases of extruding and mashing which are distinctly different things. If a hot, boiled potato is indiscriminately crushed and all starch cells ruptured, upon cooling it will be observed that the mashed potato has become gelatinous and sticky. This appearance is an indication that the cells have been ruptured. If this mashed potato is dehydrated, and it is then attempted to reconstitute the same by adding water to bring it back to mashed form, it will be observed that the dried pieces will fail to react with the water and will merely become soggy. If, on the other hand, the hot, boiled potatoes were ideally extruded into shreds so that no cells would be disrupted it would be observed that upon cooling these shreds would be semidry—not sticky. After dehydrating these shreds they may be brought to a mashed form by the addition of water. The result would be a mashed potato with no free water. Both of these cases are ideal, as actually ordinary mashing does not rupture all cells and extruding does not fail to rupture some cells. It is, therefore, desirable to obtain as nearly as possible ideal extrusion.

Another problem is the dehydration problem. This is accomplished by passing the potato through dryers in which dry heated air is circulated. One of the chief factors is the surface exposed. One cubic inch of potato which has been mashed has an effective exposed area of six square inches. One cubic inch of potato which has been extruded into $\tfrac{1}{16}''$ x $\tfrac{1}{16}''$ shreds has sixty-six square inches of exposed area. Therefore, if by some method potatoes were crushed without rupturing the cells it could be dried and reconstituted. Proper extrusion is the most practical method for doing this.

Another point to be considered is handling of the extruded potato. After extrusion the shreds are slightly damp and if they rub against each other with any slight pressure lumping will occur which requires longer drying times.

Referring to the drawing, wherein like numerals indicate identical parts, 1 is a hollow cylindrical shell provided with special openings. A shaft 2, provided with a vane 3, which is suitably secured to the shaft 2, as by welds 4 and 5, is centrally located in the hollow cylinder 1. A close clearance is maintained between the vane 3 of the shell 1, this clearance preferably being just sufficient to prevent mechanical wear. A feeding hopper 6 fits over a special opening in the top of the cylinder 1, and a thin perforated metal sheet fits over another special opening in the bottom of the cylinder 1. A spacer or baffle 8 is securely fastened to the perforated plate 7, directly beneath the center of the shaft 2. A stiffener frame 9 holds the perforated plate or die 7 in place and is in turn held in place by two rows of bolts 10 and 11. Two structural channel members 12 and 13 are integrally fastened to the shell 1 as by welds 14, 15, 16 and 17, the integrated shell and channel members 12 and 13 being fastened by bolts 18 and 19 to the main supporting members 20 and 21.

The housing 1 is sealed at each end with caps 26 and 27 through which the shaft 2 passes. The shaft 2 is supported by pillow blocks 28, 29 and 30. A pinion 31 secured to the shaft 2 and a gear 32 secured to an idler shaft 33 supported on pillow blocks 34 and 35 transmits an oscillating motion to the shaft 2.

This oscillating motion may conveniently be brought about by means of a crank 36 fastened to gear 32, which receives its angular oscillation through connecting rod 37 from crank 38 which is driven from any suitable power source, not shown. Any other suitable mechanism may be provided for positively providing the shaft 2 and vane 3 with an oscillating motion.

Since the feed to the perforated plate or die is positive, a pressure release must be provided as otherwise undue mashing would occur. High pressure extrusion might result from eyes, fibers, skins or other foreign material clogging the die or from over feeding. To prevent this the die is held in place unsupported except at the edges, so that high pressures arch the plate sufficiently to allow the material to by-pass to the other side of the chamber.

The baffle 8 is provided to prevent by-passing of material which might pass between the smooth surface of the oscillating shaft and die in the normal operation of the device. The baffle also acts as a stiffener to prevent longitudinal sagging of the die, particularly in the longer devices.

In operation the materials to be extruded such as boiled potatoes are first fed into the hopper 6. The potatoes will fall into the space above the vane 3 and into the side of the chamber opposite that in which the vane is located. During the first part of the travel as the vane rotates counter-clockwise from the position shown in Figure 2, the potatoes merely locate themselves compactly, and during the latter part of the stroke they are extruded. As the vane rotates past the upper opening, potatoes from the hopper fall into the side of the chamber previously occupied by the vane, and as the vane travels downwardly the space above it is also filled. When the vane reverses motion the compacting and extruding actions are repeated, the material thus being alternately extruded from opposite sides of the die.

By using a perforated plate each hole produces a separate shred which does not rub against the adjacent thread. This is not true of a wire cloth. Also it has also been found that any support under the perforated plate produces mashed lumps. By locating the extruder over a drying belt, for example, at a predetermined height, the shreds being extruded become longer until they break by their own weight. By controlling the rate of oscillations in the extruder and the speed of the dryer belt, the extruder can distribute a uniform bed of shreds of any desired thickness even when the extruder is not uniformly loaded. This is because the pressure applied is positive and only a relatively thin uniform thickness of potatoes is subjected to extrusion at a time. This feature also aids in retarding mashing such as might be caused if a long column of material were being subjected to the extrusion pressures necessary in such a case.

A small uniform clearance between the end of the vane and the inner wall of the shell is desirable. This prevents the mixing and resulting mashing of the material such as would result if the clearance were large or not uniform. For this reason the shell is preferably cylindrical and the axis of revolution of the vane is made to coincide with the longitudinal axis of the shell.

The apparatus may be of any suitable length, and may be used in conjunction with any suitable drying means. Thus the extruded shreds may be carried into the dryer on a continuous belt, on trays or other suitable means. Excellent results are obtained when using a tunnel dryer having a single continuous belt which passes from underneath the extruder into the dryer.

The apparatus may, of course, be used for extruding any suitable material but is particularly useful in the preparation of dehydrated food products such as potatoes and the like.

Having described the invention what is claimed is:

1. In an extruding device, a horizontal, cylindrical shell with an opening in the upper half thereof to allow the entrance of material, an oscillatable shaft centrally located in said shell, a radial vane extending from said shaft substantially to the surface of said shell and oscillatable with said shaft, said shaft and vane being rotatable through more than 180° and serving first to exert an extruding pressure, and then both a vertical extruding pressure and a horizontal by-passing pressure, a thin perforated plate secured in a horizontal position against an opening in the bottom of said shell, means normally closing the space between said shaft and the central section of said plate, and yieldable means for by-passing material from one side of said closure means to the other upon the application of overload pressure, the release of said yieldable means being incident to the oscillation of the vane through an angle sufficiently great so that a horizontal by-passing is obtained.

2. In an extruding device, a cylindrical shell, means for feeding material to the upper portion of said shell, an oscillatable shaft centrally located in said shell, a radial vane extending from said shaft substantially to said shell and oscillatable with said shaft, said shaft and vane being rotatable through more than 180° and serving first to exert an extruding pressure, and then both a vertical extruding pressure and a horizontal by-passing pressure, a thin, perforated plate secured in a horizontal position against an opening in the bottom of said shell, and means normally closing the space between the shaft and the central section of the perforated plate, said perforated plate being yieldable upon the application of overload pressure to permit by-passing of material from one side of said closure means to the other.

3. In an extruding device, a horizontal cylindrical shell, means for feeding material into the upper portion of said shell, an oscillatable shaft centrally located in said shell, a radial vane extending from said shaft substantially to said shell and oscillatable with said shaft, said shaft and vane being rotatable through more than 180° and serving first to exert an extruding pressure and then both a vertical extruding pressure and a horizontal by-passing pressure, a thin, perforated plate secured in a horizontal position against an opening in the bottom of said shell, a baffle member mounted on said plate normally closing the opening between said shaft and the central portion of the plate, said plate being yieldable upon the application of overload pressure to cause by-passing of material from one side of said baffle to the other.

HARRY F. EISENGREIN.